(12) United States Patent
Burton et al.

(10) Patent No.: US 10,079,503 B2
(45) Date of Patent: Sep. 18, 2018

(54) ALTERNATIVE ENERGY CAR SUN VISOR

(71) Applicants: Valencia Burton, Oakland, CA (US); Michael Horton, Oakland, CA (US)

(72) Inventors: Valencia Burton, Oakland, CA (US); Michael Horton, Oakland, CA (US)

(*) Notice: Subject to any disclaimer, the term of this patent is extended or adjusted under 35 U.S.C. 154(b) by 48 days.

(21) Appl. No.: 15/272,938

(22) Filed: Sep. 22, 2016

(65) Prior Publication Data

US 2018/0083480 A1 Mar. 22, 2018

(51) Int. Cl.
*H02J 7/00* (2006.01)
*H02J 7/35* (2006.01)
*H02S 20/32* (2014.01)
*H02S 40/32* (2014.01)
*H02S 40/38* (2014.01)
*H02S 40/22* (2014.01)
*B60J 3/02* (2006.01)

(52) U.S. Cl.
CPC ............... *H02J 7/35* (2013.01); *B60J 3/0278* (2013.01); *H02J 7/0044* (2013.01); *H02S 20/32* (2014.12); *H02S 40/22* (2014.12); *H02S 40/32* (2014.12); *H02S 40/38* (2014.12)

(58) Field of Classification Search
CPC .................................................. H02J 7/0044
USPC .......................................................... 320/101
See application file for complete search history.

(56) References Cited

U.S. PATENT DOCUMENTS

| | | | | |
|---|---|---|---|---|
| 5,076,634 A | * | 12/1991 | Muller | B60J 3/0278 136/245 |
| 9,792,735 B2 | * | 10/2017 | Elliott | G07C 5/008 |
| 2002/0066539 A1 | * | 6/2002 | Muller | B60J 3/0204 160/370.22 |
| 2011/0227361 A1 | * | 9/2011 | Dai | B60J 3/0204 296/97.5 |
| 2012/0197486 A1 | * | 8/2012 | Elliott | G07C 5/008 701/33.2 |
| 2017/0080782 A1 | * | 3/2017 | Spencer | B60J 3/04 |
| 2017/0313248 A1 | * | 11/2017 | Kothari | B60R 1/008 |

* cited by examiner

*Primary Examiner* — Suchin Parihar
(74) *Attorney, Agent, or Firm* — Kilpatrick Townsend & Stockton LLP

(57) ABSTRACT

A sun visor assembly for a motorized vehicle includes first and second panels configured to be pivotally mounted to a sun visor support rod. The second panel includes a solar panel to generate power to charge a portable device. The sun visor assembly includes a solar panel voltage regulator configured to generate a regulated electric power from electric power generated by the solar panel. The solar panel voltage regulator is operatively coupled with a device charging output port to output the regulated electric power to charge the portable device.

20 Claims, 6 Drawing Sheets

ALTERNATIVE ENERGY CAR SUN VISOR

BACKGROUND

Chargeable portable devices are in widespread usage. For example, many people bring a chargeable cellular phone with them most if not all of the time. Most portable chargeable devices include a display that indicates the charge state of the device so that the device can be charged prior to the device becoming completely discharged.

When traveling in a motor vehicle, chargeable devices can be charged via a vehicle charger power adapter. Many vehicle charger power adapters include an input connector configured to connect to a vehicle 12 volt power outlet and a voltage converter that converts the 12 volt direct current power to generate 5 Volt direct current power used to charge the device. When the vehicle motor is running, the vehicle battery is kept charged via power produced by the vehicle alternator.

When the vehicle motor is stopped, however, power output via the vehicle 12 volt power outlet discharges the vehicle battery. If the power drained from the vehicle battery is sufficiently large, the vehicle battery may become discharged to a level that is insufficient to start the vehicle motor. To avoid such a situation, the vehicle may be intermittently run just to charge the vehicle battery, thereby consuming fuel and generating emissions.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

A sun visor assembly for a motorized vehicle includes a solar panel to generate electric power and an device charging output port for charging a portable device via the generated electric power. Portable devices can be charged via the electric power generated by the sun visor assembly, thereby reducing the need to start the motorized vehicle just to ensure adequate charge of the vehicle battery and avoiding related consumption of fuel and generation of emissions.

Thus, in one aspect, a sun visor assembly for a motorized vehicle includes a first panel, a second panel, a device charging output port (e.g., a Universal Serial Bus (USB) port), and a solar panel voltage regulator. The first panel is configured to be pivotally mounted to a sun visor support rod to accommodate selective orientation of the first panel relative to the sun visor support rod. The second panel is configured to be pivotally mounted to the sun visor support rod, in conjunction with the first panel, to accommodate selective orientation of the second panel relative to the sun visor support rod. The second panel includes a solar panel configured to generate electric power in response to sunlight incident on the solar panel. The solar panel voltage regulator is configured to be operatively coupled with the solar panel to receive the electric power generated by the solar panel. The solar panel voltage regulator outputs a regulated electric power generated from the electric power received from the solar panel. The regulated electric power has a regulated voltage (e.g., 5 Volts). The solar panel voltage regulator is operatively coupled with the device charging output port to output the regulated electric power to charge a portable device.

The sun visor assembly can include a rechargeable battery module. The rechargeable battery module can be configured to store at least a portion of the regulated electric power output by the solar panel voltage regulator. The chargeable battery can output electric power via the device charging output port to charge a portable device.

In many embodiments, the solar panel is detachable. For example the second panel can include a hinge member configured to be pivotally mounted to the sun visor support rod to accommodate selective orientation of the hinge member relative to the sun visor support rod. The solar panel and the hinge member can be configured for detachable mounting of the solar panel to the hinge member. In many embodiments, the sun visor assembly includes a tinted panel that can be detachably mounted to the hinge member.

The device charging output port and the solar panel voltage regulator can be mounted to any suitable component (s) of the sun visor assembly. For example, in many embodiments the device charging output port and the solar panel voltage regulator are mounted to the first panel.

The electric power generated by the solar panel can be transferred to the solar panel voltage regulator using any suitable approach. For example, the sun visor assembly can include a solar power output port, a solar panel power cord, and a solar panel input port. The solar power output port can be mounted to the second panel and be configured to output the electric power generated by the solar panel. The solar panel power cord can include a solar panel power cord input connector, a solar panel power cord output connector, and a flexible cord operatively connecting the solar panel cord input and output connectors. The solar panel cord input connector can be configured to connect to the solar power output port. The flexible cord can be configured to accommodate a range of different relative orientations between the first and second panels around the sun visor support rod. The solar power input port can be coupled with the solar panel voltage regulator and configured to be connected with the solar panel power cord output connector to transfer the power generated by the solar panel to the solar panel voltage regulator.

The sun visor assembly can be configured to utilize 12 Volt accessory power from the motorized vehicle. For example, the sun visor assembly can include an accessory power input connector and an accessory power voltage converter. The accessory power input connector can be configured to receive 12 Volt accessory power from the motorized vehicle. The accessory power voltage converter can be configured to generate a second regulated electric power from the 12 Volt accessory power received via the accessory power input connector. The second regulated electric power can have the regulated voltage (e.g., 5 Volts). The accessory power voltage converter can be operatively connected with the device charging output port to output the second regulated electric power to charge a portable device.

In many embodiments, each of the first and second panels maintain their respective orientation absent user reorientation. For example, the sun visor assembly can include the sun visor support rod. Each of the first and second panels can be mounted to the sun visor support rod to maintain a selected orientation of the respective one of the first and second panels relative to the sun visor support rod absent a user induced reorientation of the respective one of the first and second panels.

The sun visor assembly can include a mirror and/or one or more lighting elements. For example, the sun visor assembly can include a mirror mounted to the first panel, one or more lighting elements mounted to the first panel, and a rechargeable battery module. The rechargeable battery module can be configured to store at least a portion of the regulated electric power output by the solar panel voltage regulator. Electric power can be output from the rechargeable battery module to the one or more lighting elements to illuminate the one or more lighting elements. The mirror can be mounted to the first panel to be repositionable relative to the first panel via a user induced repositioning of the mirror.

In another aspect, a method of charging a portable device via solar panel employs a sun visor mounted solar panel to generate electric power used to charge the portable device. The method includes pivotally supporting a first panel by a sun visor support rod coupled to a motorized vehicle to accommodate selective orientation of the first panel relative to the sun visor support rod. A solar panel is also pivotally supported, in conjunction with the first panel, by the sun visor support rod to accommodate selective orientation of the solar panel relative to the sun visor rod. Electric power is generated via the solar panel in response to sunlight incident on the solar panel. A regulated electric power is generated via the electric power generated by the solar panel. The regulated electric power has a regulated voltage (e.g., 5 Volts). The portable device is charged by outputting the regulated electric power via a device charging output port supported via the sun visor support rod. In many embodiments, the method includes maintaining a selected orientation of each of the first and second panels relative to the sun visor support rod absent a user induced reorientation of the respective one of the first and second panels.

The method can include storing at least a portion of the regulated electric power output by the solar panel voltage regulator in a rechargeable battery module. Electric power from the rechargeable battery module can be output via the device charging output port to charge the portable device.

The method can include detachably mounting the solar panel. For example, pivotally supporting the solar panel by the sun visor rod can include pivotally supporting a hinge member by the sun visor support rod to accommodate selective orientation of the hinge member relative to the sun visor support rod. The solar panel can be detachably mounted to the hinge member. The method can include demounting the solar panel from the hinge member and mounting a tinted panel onto the hinge member.

The method can include transferring the electric power generated by the solar panel to the solar panel voltage regulator using any suitable approach. For example, the method can include supporting the device charging output port and the solar panel voltage regulator via the first panel. The electric power generated by the solar panel can be transferred via a flexible power cord configured to accommodate a range of different relative orientations between the first panel and the solar panel around the sun visor support rod.

The method can include utilizing 12 Volt accessory power from the motorized vehicle. For example, the method can include receiving 12 Volt accessory power and generating a second regulated electric power from the 12 Volt accessory power. The second regulated electric power can have the regulated voltage. The second regulated power can be outputted via the device charging output port to charge a portable device.

The method can include supporting a mirror and/or one or more lighting elements via the first panel. At least a portion of the regulated electric power output by the solar panel voltage regulator can be stored in a rechargeable battery module. Electric power can be output from the rechargeable battery module to the one or more lighting elements to illuminate the one or more lighting elements. The method can include repositioning the mirror relative to the first panel via a user induced repositioning of the mirror.

For a fuller understanding of the nature and advantages of the present invention, reference should be made to the ensuing detailed description and accompanying drawings.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
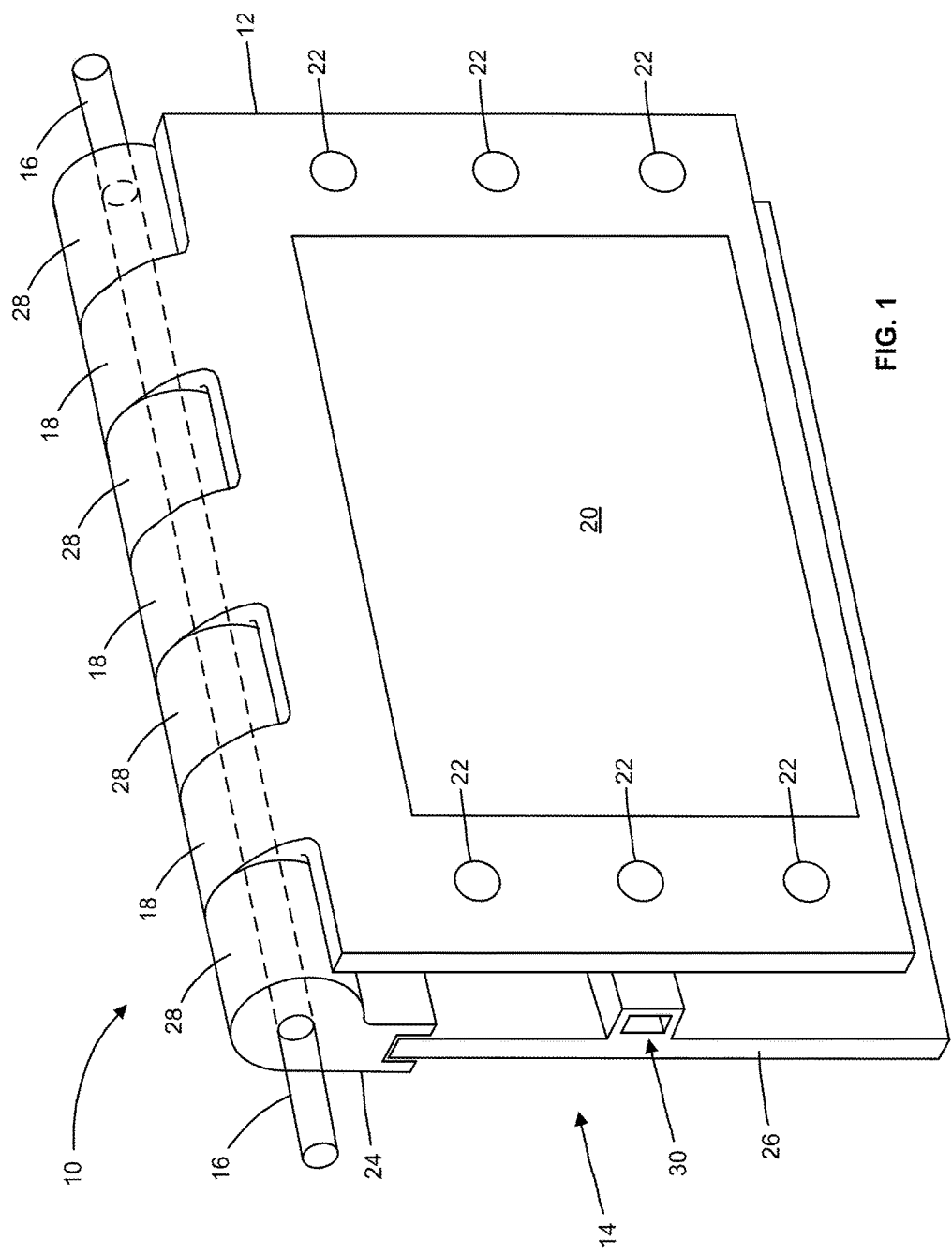
FIG. 1 illustrates a sun visor assembly configured to generate electric power to charge a portable chargeable device, in accordance with embodiments.

Referring now to the drawings, in which like reference numerals represent like parts throughout the several views, FIG. 1 shows a sun visor assembly 10, in accordance with embodiments. The sun visor assembly 10 includes a first panel 12, a second panel 14, and a sun visor support rod 16.

The first panel 12 is configured for use as a sun-blocking element similar to existing sun visor panels. In the illustrated embodiment, the first panel 12 includes three hinge portions 18. The first panel 12 can include any suitable number of the hinge portions 18. Each of the first panel hinge portions 18 has an aperture through which the sun visor support rod 16 extends so that the first panel 12 is pivotally mounted to the support rod 16. In many embodiments, the material of the first panel hinge portions 18 is selected and/or the diameter of the apertures through the hinge portions 18 is sized to prevent free rotation of the first panel 12 around the support rod 16 so that the first panel 12 maintains a selected orientation relative to the support rod 16 absent a user induced reorientation of the first panel 12. Accordingly, the first panel 12 can be selectively oriented relative to the support rod 16 by a user to place the first panel 12 in a suitable position, for example, to block sunlight from impairing driver vision. In many embodiments, the support rod 16 is mounted to a motor vehicle similar to existing motor vehicle sun visor support rods to be pivoted between extending parallel to the vehicle front windshield to extending parallel to the vehicle side window. In the illustrated embodiment, the first panel 12 includes a mirror 20 and mirror lighting elements 22. In embodiments described herein, the mirror 20 is mounted to the first panel 12 (e.g., via sliding mounts) to be repositionable relative to the first panel 12.

In the illustrated embodiment, the second panel 14 includes a hinge member 24 and a detachable panel 26 that is detachably mountable to the hinge member 24. In the illustrated embodiment, the hinge member 24 includes 5 hinge portions 28. The hinge member 24 can include any suitable number of the hinge portions 28. Each of the hinge portions 28 has an aperture through which the sun visor support rod 16 extends so that the hinge member 24 is pivotally mounted to the support rod 16. In many embodiments, the material of the hinge portions 28 is selected and/or the diameter of the apertures through the hinge portions 28 is sized to prevent free rotation of the hinge member 24 around the support rod 16 so that the second panel 14 maintains a selected orientation relative to the support rod 16 absent a user induced reorientation of the second panel 14.

The detachability of the panel 26 enables the capability to mount different panels to the hinge member 24. In many embodiments, one detachable panel 26 that can be mounted to the hinge member 24 includes a solar panel to generate solar power for charging a portable device as described herein and/or to power the mirror lighting elements 22. In many embodiments, one or more detachable panels 26 that can be mounted to the hinge member 24 include one or more different tinted panels that can be attached to reduce glare.

In many embodiments, the sun visor assembly 10 includes a device charging output port 30 (e.g., a Universal Serial Bus (USB) port) suitable for connecting a charging cable to for charging a portable chargeable device (e.g., a cellular phone, etc.). In the illustrated embodiment, the device charging output port 30 is mounted to the second panel 14. The device charging output port 30 can, however, be mounted to any suitable component of the sun visor assembly 10. In many embodiments, electric power generated via a solar panel attached to the hinge member 24 is processed via a solar power voltage regulator to produce a regulated power having a regulated voltage (e.g., 5 Volts) that is output via the device charging output port 30 to charge a portable device.

Figure 2:
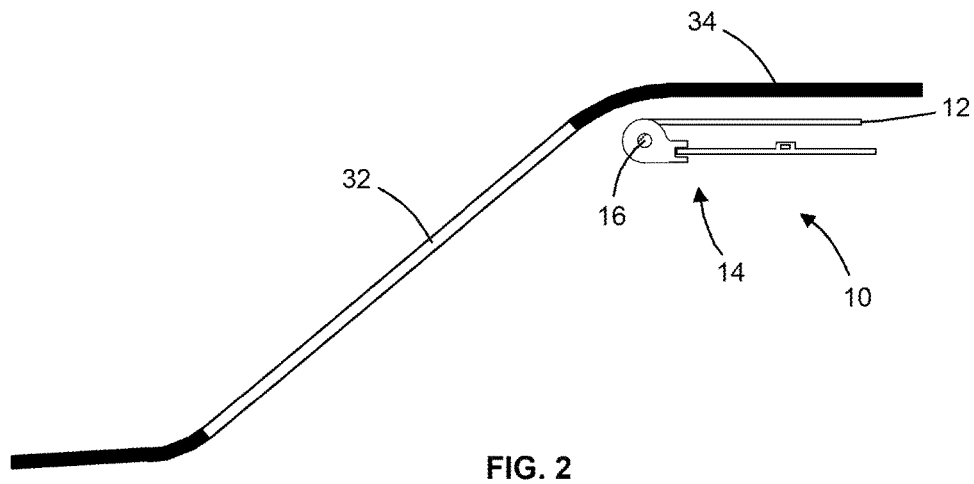
FIG. 2 is a cross-sectional schematic illustration of the sun visor assembly of FIG. 1 in a configuration in which the first and second panels are stowed, in accordance with embodiments.

FIG. 2 is a cross-sectional schematic illustration of the sun visor assembly 10 in a configuration in which the first panel 12 and the second panel 14s are stowed and the support rod 16 is oriented to extend parallel to a vehicle front windshield 32. In the illustrated configuration, both the first panel 12 and the second panel 14 extend aft parallel to the roof 34 of the motorized vehicle and are positioned out of the line of sight of the driver and/or passenger through the front windshield 32.

Figure 3:
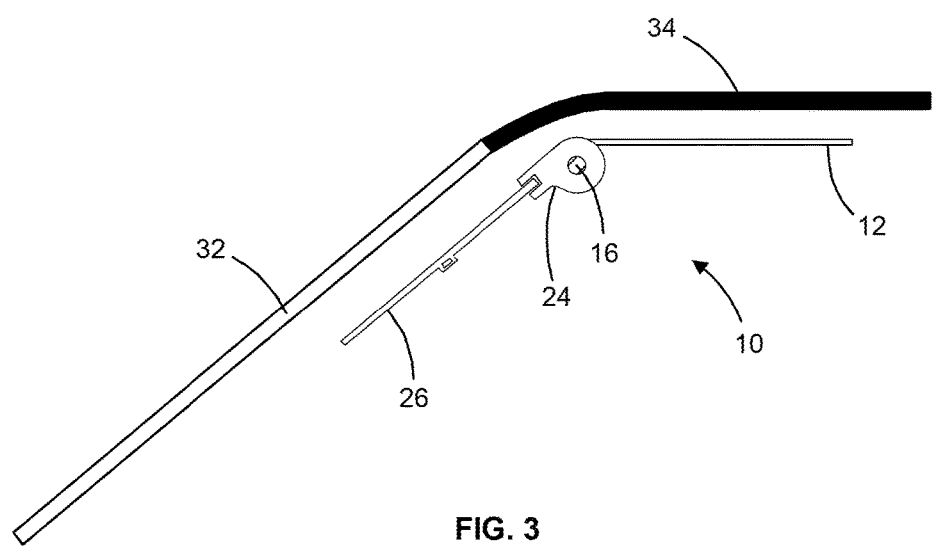
FIG. 3 is a cross-sectional schematic illustration of the sun visor assembly of FIG. 1 in a configuration in which the first panel is stowed and the second panel deployed, in accordance with embodiments.

FIG. 3 is a cross-sectional schematic illustration of the sun visor assembly 10 in a configuration in which the first panel 12 is stowed and the second panel 14 deployed, thereby positioning the detachable panel 26 to extend parallel to the front windshield 32. In the illustrated configuration, the detachable panel 26 can be a tinted detachable panel to reduce glare for the vehicle driver and/or passenger. When the detachable panel 26 includes a solar panel as described herein, the illustrated configuration can be used to orient the solar panel to receive sunlight to generate electric power. The orientation of the second panel 14 relative to the support rod 16 can be selectively varied as desired to, for example, best reduce glare or to maximize the amount of sunlight incident on the solar panel to maximize the amount of electric power generated by the solar panel.

Figure 4:
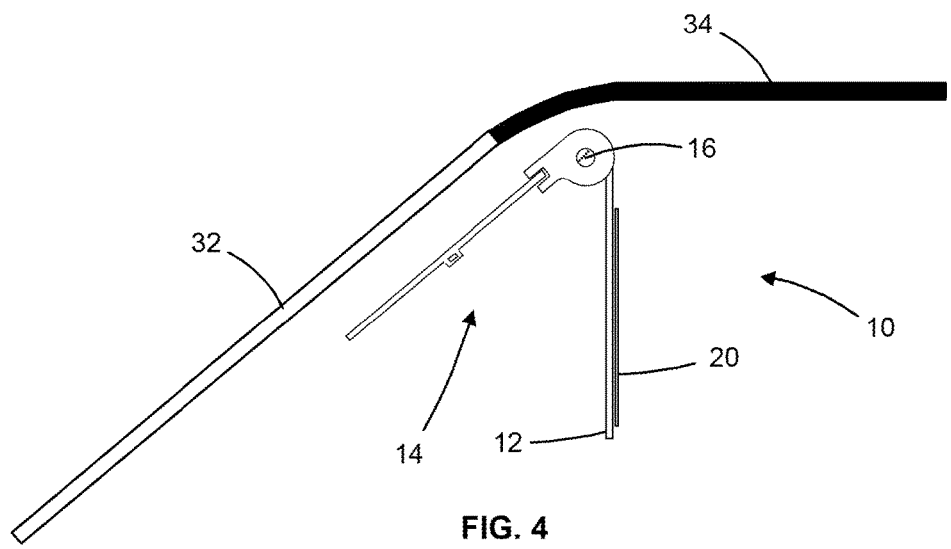
FIG. 4 is a cross-sectional schematic illustration of the sun visor assembly of FIG. 1 in a configuration in which the first and second panels are deployed, in accordance with embodiments.
Figure 5:
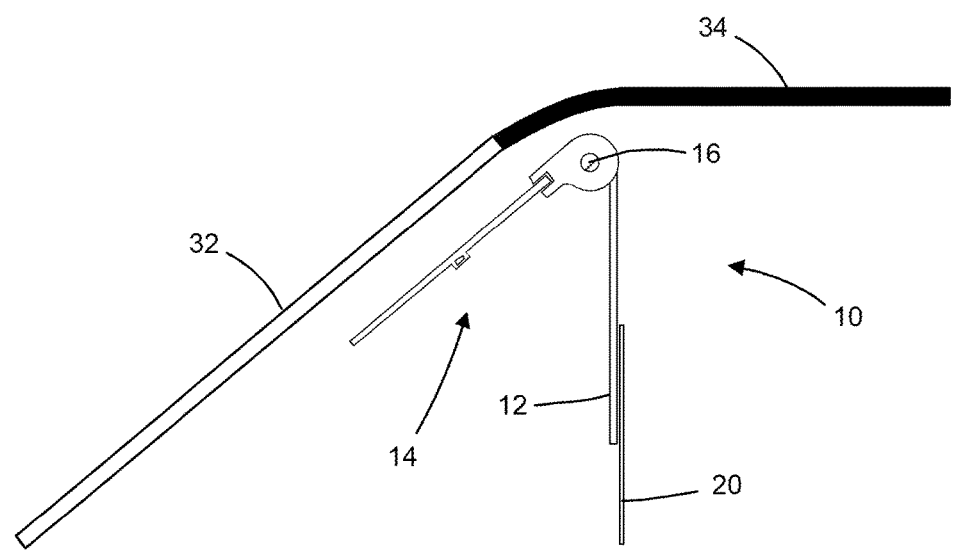
FIG. 5 is a cross-sectional schematic illustration of the sun visor assembly of FIG. 1 in a configuration in which the first and second panels are deployed and a mirror mounted to the first panel is deployed, in accordance with embodiments.

FIG. 4 is a cross-sectional schematic illustration of the sun visor assembly 10 in a configuration in which the first panel 12 and the second panel 14 are deployed, in accordance with embodiments. In the illustrated configuration, the first panel 12 is oriented substantially vertically thereby orienting the mirror 20 mounted to the first panel 12 for use by the driver or passenger of the motorized vehicle. FIG. 5 shows the mirror 20 in a deployed configuration in which the mirror 20 has been slid downward relative to the stowed configuration of the mirror shown in FIG. 4.

Figure 6:
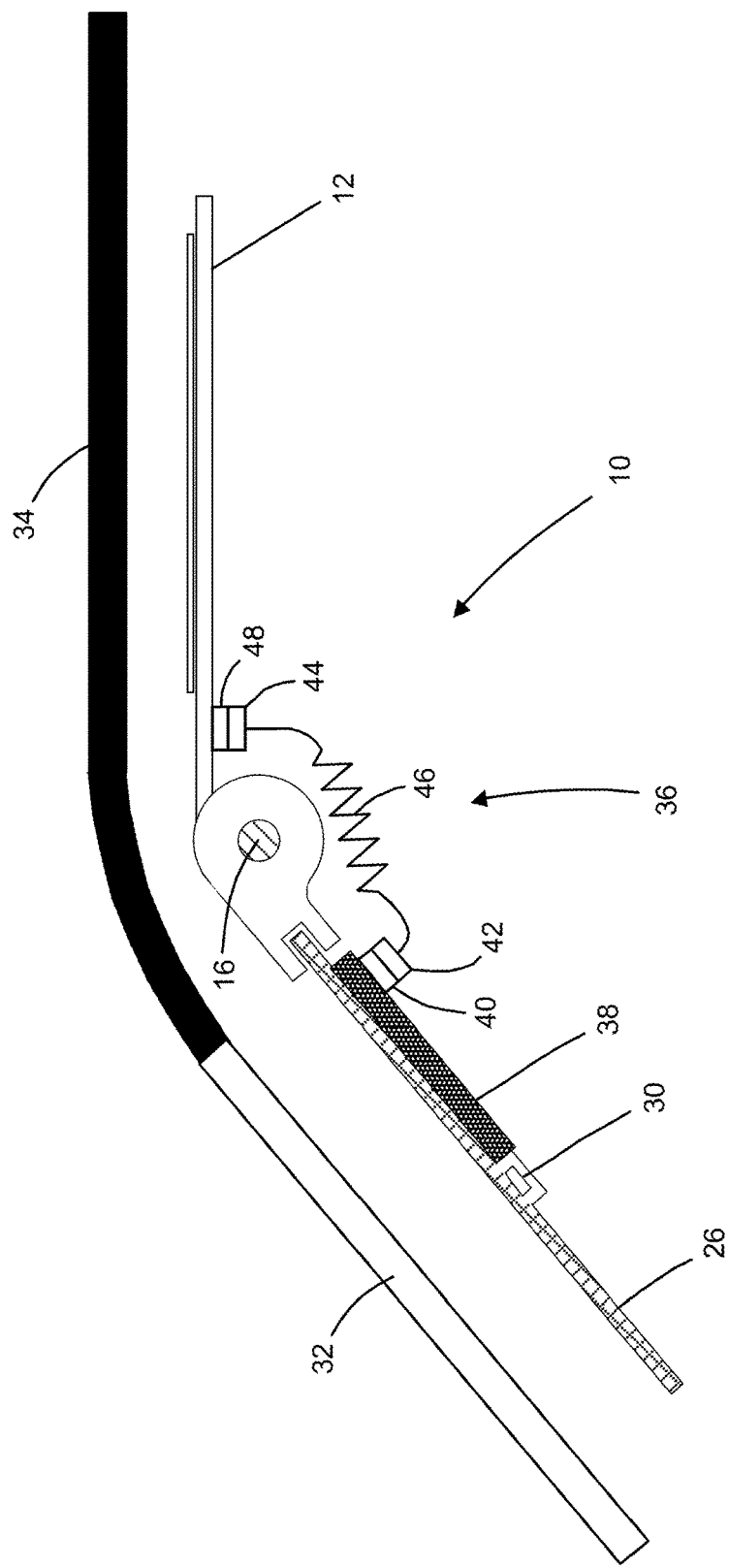
FIG. 6 is a cross-sectional schematic illustration of the sun visor assembly of FIG. 1 in a configuration in which the first panel is stowed, the second panel deployed, and a flexible solar power cord transfers power from a solar panel in the second panel to a power module mounted to the first panel, in accordance with embodiments.

FIG. 6 is a cross-sectional schematic illustration of the sun visor assembly 10 in a configuration in which the first panel 12 is stowed, the second panel 14 is deployed, and a flexible solar power cord 36 transfers power from a power module 38 mounted to the second panel 14 to the first panel 12, in accordance with embodiments. In the illustrated embodiment, the detachable panel 26 includes a solar power output port 40 configured to output electric power generated by the solar panel included in the detachable panel 26. The flexible solar power chord 36 includes a solar panel power cord input connector 42, a solar panel power cord output connector 44, and a flexible conducting cord 46 electrically coupling the solar panel power cord input connector 42 and the solar panel power cord output connector 44. The flexible conducting cord 46 is configured to accommodate a range of different relative orientations between the first panel 12 and the second panel 14 around the sun visor support rod 16. The sun visor assembly 10 includes a solar power input port 48 electrically connected to the first panel 12 and configured to be connected with the solar panel power cord output connector 44 to transfer the electric power generated by the solar panel to the first panel 12. In many embodiments, the power module 38 includes a solar panel voltage regulator that generates a regulated electric power having a regulated voltage (e.g., 5 Volts) that is output from the device charging output port 30 to charge a portable chargeable device.

Figure 7:
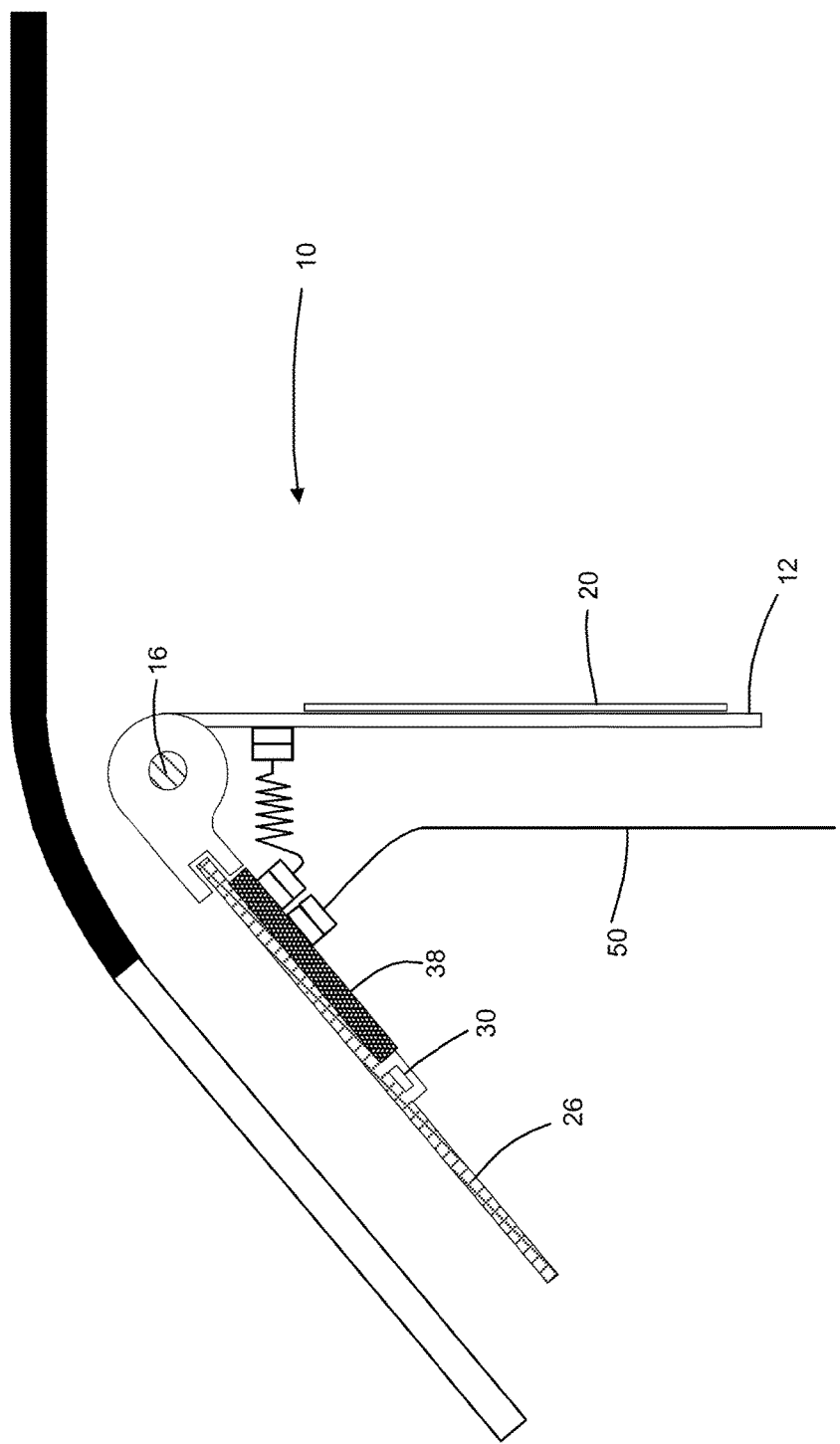
FIG. 7 is a cross-sectional schematic illustration of the sun visor assembly of FIG. 1 in a configuration in which the first and second panels are deployed and a power cord transfers 12 V accessory power to the sun visor assembly, in accordance with embodiments.

FIG. 7 is a cross-sectional schematic illustration of an embodiment of the sun visor assembly 10 in a configuration in which the first panel 12 and the second panel 14 are deployed and a power cord 50 transfers 12 V accessory power to the power module 38. In the illustrated embodiment, the power module 38 is configured to convert the 12 V accessory power to direct current power having the regulated voltage (e.g., 5 Volts). In embodiments that can utilize 12 V accessory power, the 12 V accessory power can be used to operate the mirror lights 22 and/or charge a portable chargeable device via power output through the device charging output port 30 to supplement power generated by the solar panel included in the detachable panel 26.

Figure 8:
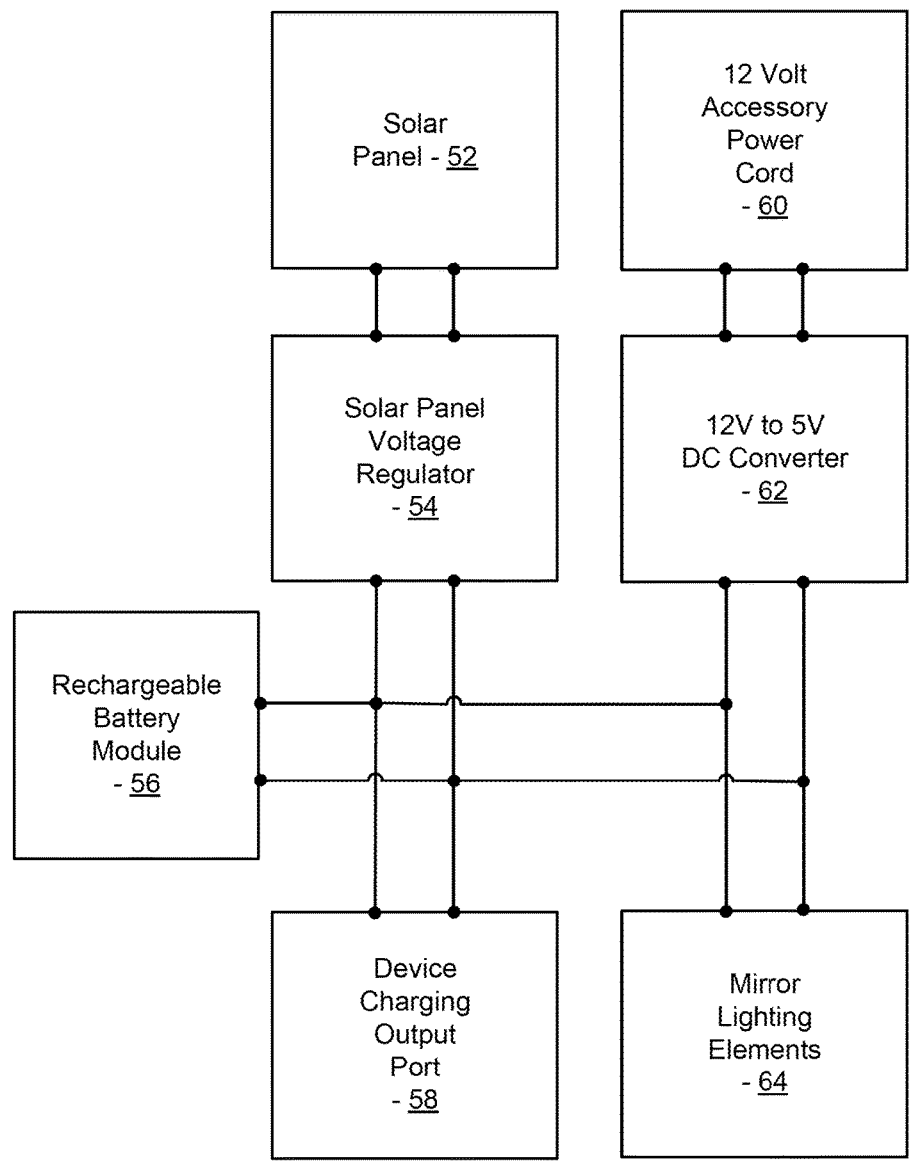
FIG. 8 is a simplified schematic diagram of electrical components of the sun visor assembly of FIG. 1, in accordance with embodiments.

FIG. 8 is a simplified schematic diagram of electrical components of the sun visor assembly 10, in accordance with embodiments. In the illustrated embodiment, the electrical components include a solar panel 52, a solar panel voltage regulator 54, a rechargeable battery module 56, a device charging output port 58, a 12 Volt accessory power cord 60, a 12 Volt to 5 Volt DC converter 62, and mirror lighting elements 64. Any suitable solar panel can be used. For example, the solar panel 52 can be configured to generate 5 Volt direct current. In many embodiments, the solar panel voltage regulator 54 is electrically connected to the solar panel 52 to receive the electric power generated by the solar panel 52 and generate regulated electric power having a constant output voltage of 5 Volts. For example, the solar panel voltage regulator 54 can be configured to receive power generated from the solar panel 52 having a varying voltage between 1 to 5 Volts and output a power having a constant voltage of 5 Volts. The 12 Volt accessory power cord 60 is connectable to a vehicle accessory power output to supply 12 Volt accessory power to the sun visor assembly 10 to supplement power generated by the solar panel 52. The 12 Volt to 5 volt converter 62 is configured to convert the 12 Volt accessory power to 5 Volt regulated power. Power from the solar power voltage regulator 54 and/or the 12 Volt accessory power converter 62 is supplied to the device charging output port 58 to charge a portable chargeable device and/or to the mirror lighting elements 64. In the illustrated embodiment, the rechargeable battery module 56 is connected between (a) the voltage regulator 54 and the power converter 62 and (b) the device charging output port 58 and the mirror lighting elements 64 to store excess power output by the voltage regulator 54 and the power converter 62 and to supplement power output by the voltage regulator 54 when the power generated by the solar panel 52 is insufficient to charge the portable device connected to the device charging output port 58 and/or to illuminate the mirror lighting element 64.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A sun visor assembly for a motorized vehicle, the sun visor assembly comprising:
   a first panel configured to be pivotally mounted to a sun visor support rod to accommodate selective orientation of the first panel relative to the motorized vehicle;
   a second panel configured to be pivotally mounted to the sun visor support rod, in conjunction with the first panel, to accommodate selective orientation of the second panel relative to the first panel, the second panel including a solar panel configured to generate electric power in response to sunlight incident on the solar panel;
   a device charging output port; and
   a solar panel voltage regulator configured to:
      be operatively coupled with the solar panel to receive the electric power generated by the solar panel;
      output a regulated electric power generated from the electric power received from the solar panel, the regulated electric power having a regulated voltage; and
      be operatively coupled with the device charging output port to output the regulated electric power to charge a portable device.

2. The sun visor assembly of claim 1, further comprising a rechargeable battery module configured to:
   store at least a portion of the regulated electric power output by the solar panel voltage regulator; and
   output electric power via the device charging output port to charge a portable device.

3. The sun visor assembly of claim 1, wherein:
   the second panel comprises a hinge member configured to be pivotally mounted to the sun visor support rod to accommodate selective orientation of the hinge member relative to the first panel; and
   the solar panel and the hinge member are configured for detachable mounting of the solar panel to the hinge member.

4. The sun visor assembly of claim 3, further comprising a tinted panel detachably mountable to the hinge member, the tinted panel being adapted to reduce glare for an occupant of the motorized vehicle.

5. The sun visor assembly of claim 1, wherein the device charging output port and the solar panel voltage regulator are mounted to the first panel.

6. The sun visor assembly of claim 5, further comprising:
a solar power output port configured to output the electric power generated by the solar panel;
a solar panel power cord including a solar panel power cord input connector, a solar panel power cord output connector, and a flexible cord operatively connecting the solar panel cord input and output connectors, the solar panel cord input connector being configured to connect to the solar power output port, the flexible cord being configured to accommodate a range of different relative orientations between the first and second panels around the sun visor support rod; and
a solar power input port coupled with the solar panel voltage regulator and configured to be connected with the solar panel power cord output connector to transfer the power generated by the solar panel to the solar panel voltage regulator.

7. The sun visor assembly of claim 1, further comprising:
an accessory power input connector configured to receive 12 Volt accessory power; and
an accessory power voltage converter to generate a second regulated electric power from the 12 Volt accessory power received via the accessory power input connector, the second regulated electric power having the regulated voltage, the accessory power voltage converter being operatively connected with the device charging output port to output the second regulated electric power via the device charging output port to charge a portable device.

8. The sun visor assembly of claim 1, further comprising the sun visor support rod, and wherein each of the first and second panels is mounted to the sun visor support rod to maintain a selected orientation of the respective one of the first and second panels relative to the motorized vehicle and the other of the first and second panels absent a user induced reorientation of the respective one of the first and second panels.

9. The sun visor assembly of claim 1, further comprising:
a mirror mounted to the first panel;
one or more mirror lighting elements mounted to the first panel adjacent to the mirror; and
a rechargeable battery module configured to:
store at least a portion of the regulated electric power output by the solar panel voltage regulator; and
output electric power to the one or more mirror lighting elements to illuminate the one or more mirror lighting elements.

10. The sun visor assembly of claim 9, wherein the mirror is repositionable relative to the first panel via a user induced repositioning of the mirror.

11. A method of charging a portable device via solar power, the method comprising:
pivotally supporting a first panel by a sun visor support rod coupled to a motorized vehicle to accommodate selective orientation of the first panel relative to the motorized vehicle;
pivotally supporting a solar panel, in conjunction with the first panel, by the sun visor support rod to accommodate selective orientation of the solar panel relative to the first panel;
generating electric power via the solar panel in response to sunlight incident on the solar panel;
generating a regulated electric power via the electric power generated by the solar panel, the regulated electric power having a regulated voltage; and
recharging a portable device by outputting the regulated electric power via a device charging output port supported via the sun visor support rod.

12. The method of claim 11, further comprising:
storing at least a portion of the regulated electric power output by the solar panel voltage regulator in a rechargeable battery module; and
outputting electric power from the rechargeable battery module via the device charging output port to charge a portable device.

13. The method of claim 11, wherein pivotally supporting the solar panel by the sun visor rod comprises:
pivotally supporting a hinge member by the sun visor support rod to accommodate selective orientation of the hinge member relative to the first panel; and
detachably mounting the solar panel to the hinge member.

14. The method of claim 11, further comprising:
demounting the solar panel from the hinge member; and
mounting a tinted panel onto the hinge member.

15. The method of claim 11, further comprising supporting the device charging output port and the solar panel voltage regulator via the first panel.

16. The method of claim 15, further comprising transferring the electric power generated by the solar panel via a flexible power cord configured to accommodate a range of different relative orientations between the first panel and the solar panel around the sun visor support rod.

17. The method of claim 11, further comprising:
receiving 12 Volt accessory power;
generating a second regulated electric power from the 12 Volt accessory power, the second regulated electric power having the regulated voltage; and
outputting the second regulated power via the device charging output port to charge a portable device.

18. The method of claim 1, further comprising maintaining a selected orientation of each of the first and second panels relative to the motorized vehicle and the other of the first and second panels absent a user induced reorientation of the respective one of the first and second panels.

19. The method of claim 1, further comprising:
supporting a mirror via the first panel;
supporting one or more mirror lighting elements adjacent to the mirror via the first panel; and
storing at least a portion of the regulated electric power output by the solar panel voltage regulator in a rechargeable battery module; and
outputting electric power from the rechargeable battery module to the one or more mirror lighting elements to illuminate the one or more mirror lighting elements.

20. The method of claim 19, further comprising repositioning the mirror relative to the first panel via a user induced repositioning of the mirror.

* * * * *